(12) United States Patent
Choi et al.

(10) Patent No.: US 7,842,430 B2
(45) Date of Patent: Nov. 30, 2010

(54) NANOCOMPOSITE, NANOCOMPOSITE ELECTROLYTE MEMBRANE INCLUDING THE SAME AND FUEL CELL INCLUDING THE NANOCOMPOSITE ELECTROLYTE MEMBRANE

(75) Inventors: Yeong-suk Choi, Yongin-si (KR); Sang-hoon Joo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 557 days.

(21) Appl. No.: 11/847,036

(22) Filed: Aug. 29, 2007

(65) Prior Publication Data

US 2008/0220309 A1    Sep. 11, 2008

(51) Int. Cl.
*H01M 2/00* (2006.01)
(52) U.S. Cl. ............... 429/482; 524/424; 524/609; 429/400; 977/745
(58) Field of Classification Search .............. 429/33, 429/12; 524/424, 609; 977/745
See application file for complete search history.

(56) References Cited

U.S. PATENT DOCUMENTS 5,235,044 A * 8/1993 Mercer et al. .......... 534/551

2006/0233692 A1* 10/2006 Scaringe et al. ......... 423/335
2006/0275648 A1* 12/2006 Kim et al. ................ 429/42

FOREIGN PATENT DOCUMENTS

JP    9-245818    9/1997

* cited by examiner

*Primary Examiner*—Melvin C Mayes
*Assistant Examiner*—Melissa Stalder
(74) *Attorney, Agent, or Firm*—Lee & Morse P.C.

(57) ABSTRACT

A nanocomposite includes metal-carbon nanotubes and a sulfonated polysulfone. In the nanocomposite, the sulfonated polysulfone and the metal-carbon nanotubes have strong attraction therebetween due to π-π interactions or van der Waals interactions, and thus the nanocomposite has excellent ionic conductivity and mechanical properties. In addition, the nanocomposite includes a metal that can be used as a catalyst for an anode, and thus the reduction in power generation caused by methanol crossover can be minimized. Therefore, a nanocomposite electrolyte membrane prepared using the nanocomposite can minimize the reduction in power generation caused by the crossover of a polar organic fuel such as methanol. In a fuel cell employing the nanocomposite electrolyte membrane, when an aqueous methanol solution is used as a fuel, crossover of the methanol is more suppressed, and accordingly, the fuel cell has an improved operating efficiency and a longer lifetime.

17 Claims, 5 Drawing Sheets

NANOCOMPOSITE, NANOCOMPOSITE ELECTROLYTE MEMBRANE INCLUDING THE SAME AND FUEL CELL INCLUDING THE NANOCOMPOSITE ELECTROLYTE MEMBRANE

CROSS-REFERENCE TO RELATED APPLICATION

This application claims the benefit of Korean Application No. 2006-133099, filed Dec. 22, 2006, in the Korean Intellectual Property Office, the disclosure of which is incorporated herein by reference.

BACKGROUND OF THE INVENTION

1. Field of the Invention

Aspects of the present invention relate to a nanocomposite, a nanocomposite electrolyte membrane including the same, and a fuel cell including the nanocomposite electrolyte membrane. More particularly, aspects of the present invention relate to a sulfonated polysulfone/metal-carbon nanotube nanocomposite having excellent mechanical properties and ionic conductivity, a nanocomposite electrolyte membrane comprising the nanocomposite, and a fuel cell including the nanocomposite electrolyte membrane.

2. Description of the Related Art

Conventional fuel cells can be classified into polymer electrolyte membrane fuel cells (PEMFCs), phosphoric acid cells, molten carbonate cells, solid oxide cells, and the like. The operating temperature of fuel cells and constituent materials thereof are dependent on the type of electrolyte used in the fuel cells.

The basic structure of a PEMFC may include an anode (fuel electrode), a cathode (oxidizing agent electrode), and a polymer electrolyte membrane interposed between the anode and the cathode. The anode may include a catalyst layer to promote the oxidation of a fuel. The cathode may include a catalyst layer to promote the reduction of an oxidizing agent.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient ionic conductivity, electrochemical stability, high mechanical strength and thermal stability at an operating temperature thereof, and thin layers of the polymer electrolyte membrane should be easily formed.

For example, Japanese Patent Laid-open Publication No. hei 9-245818 discloses sulfonated polysulfone as a material used to form a polymer electrolyte membrane. However, the sulfonated polysulfone has poor mechanical properties in a wet-laid state. In addition, a fuel cell using the sulfonated polysulfone has a high probability of methanol crossover, and thus such a fuel cell cannot generate a large amount of power.

SUMMARY OF THE INVENTION

Aspects of the present invention provide a nanocomposite having excellent mechanical properties and improved ion conductivity.

Aspects of the present invention also provide a nanocomposite electrolyte membrane including the nanocomposite and a fuel cell including the nanocomposite electrolyte membrane.

According to an aspect of the present invention, there is provided a nanocomposite comprising: a metal-carbon nanotube (CNT); and a sulfonated polysulfone. The sulfonated polysulfone may be represented by Formula 1 below:

Formula 1

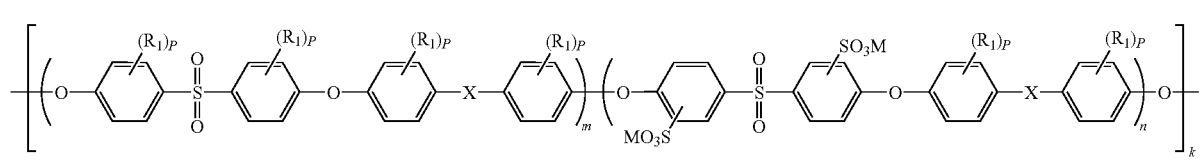

where each of the $R_1$s is independently a C1-C10 alkyl group, a C2-C10 alkenyl group, a C6-C20 aryl group or a nitro group, P is an integer in the range of 0-4, X is $-C(CF_3)_2-$, $-C(CH_3)_2-$ or $-P(=O)Y'-$ (Y' is H or $C_6H_5$), M is Na, K, or H, m is 0.1-10, n is 0.1-10, and k is 5-500.

According to an aspect of the present invention, the sulfonated polysulfone may be a polymer compound represented by Formula 2 below:

Formula 2

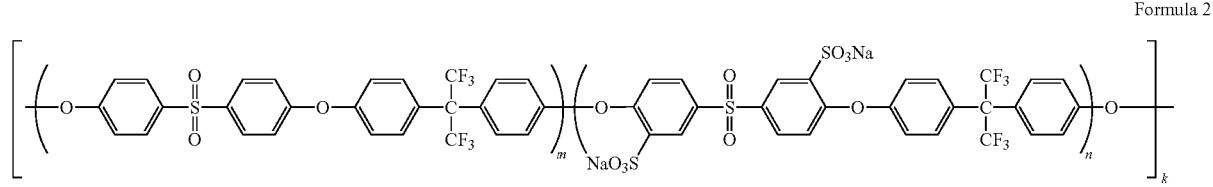

where m is 0.1-4, and n is 0.1-4, and k is 5-500.

According to an aspect of the present invention, the metal-carbon nanotubes may comprise at least one metal selected from the group consisting of Pt, Pd, Ru, Rh, Ir, Au and alloys thereof.

According to an aspect of the present invention, the metal-carbon nanotubes may comprise a PtRu alloy.

According to an aspect of the present invention, the metal-carbon nanotubes may further comprise a —$SO_3H$ group.

According to an aspect of the present invention, the sulfonation degree of the sulfonated polysulfone may be 40-80%.

According to an aspect of the present invention, the amount of the metal-carbon nanotubes may be 0.01-20 parts by weight based on 100 parts by weight of the nanocomposite.

According to an aspect of the present invention, the amount of metal of the metal-carbon nanotubes may be 0.01-40 parts by weight based on 100 parts by weight of the metal-carbon nanotubes.

According to another aspect of the present invention, there is provided a nanocomposite electrolyte membrane comprising the nanocomposite.

According to another aspect of the present invention, there is provided a fuel cell comprising: a cathode, an anode, and a nanocomposite electrolyte membrane comprising the nanocomposite, wherein the nanocomposite electrolyte membrane is disposed between the cathode and the anode.

According to another aspect of the present invention, there is provided a method of making an electrolyte membrane comprising a nanocomposite comprising metal-carbon nanotubes and a sulfonated polysulfone, the method comprising mixing the metal-carbon nanotubes and the sulfonated polysulfone in an organic solvent to provide a mixed solution; sonicating the mixed solution; stirring the sonicated, mixed solution to form a dispersion solution containing the nanocomposite; casting or coating the dispersion solution onto a support and drying the cast or coated dispersion to form the electrolyte membrane Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
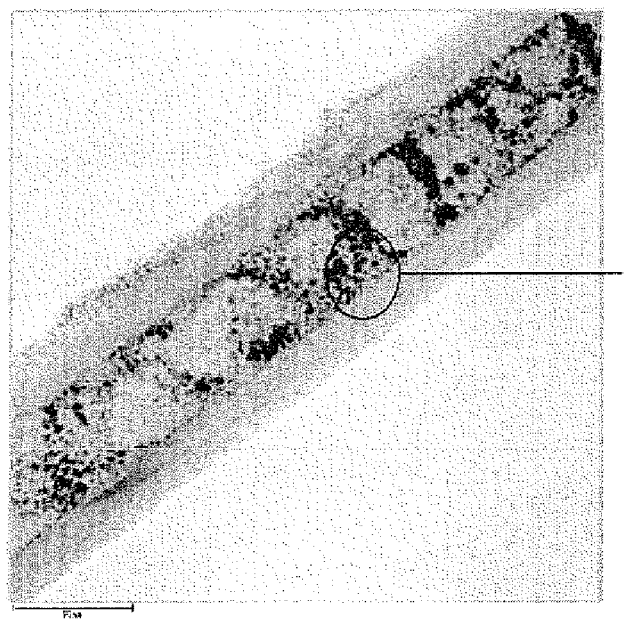
FIGS. 1A and 1B are transmission electron micrograph (TEM) images of PtRu-carbon nanotube used to prepare a nanocomposite according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings, in which exemplary embodiments of the invention are shown.

Aspects of the present invention provide a nanocomposite that comprises metal-carbon nanotubes and a sulfonated polysulfone, thereby having excellent mechanical properties and ionic conductivity and being able to suppress methanol crossover in an electrolyte membrane.

In general, when an electrolyte membrane used to prepare a fuel cell is prepared using a sulfonated polysulfone having a high sulfonation degree, the prepared electrolyte membrane has improved ionic conductivity. However, in an acid treatment process after the electrolyte membrane is prepared, the sulfonated polysulfone is changed to a gel-like form, thereby losing its mechanical strength, or becomes completely dissolved in water. Taking these factors into consideration, using a conventional sulfonated polysulfone is not recommended despite the gains in ionic conductivity. Therefore, a polymer with a high sulfonation degree in which the mechanical strength at a wet-laid state is improved is desirable so that a nanocomposite electrolyte membrane having both a high hydrogen ionic conductivity and a sufficient mechanical strength can be obtained.

In a method of preparing the nanocomposite according to an embodiment of the present invention, metal-carbon nanotubes are wrapped by a sulfonated polysulfone. In the nanocomposite according to an embodiment of the present invention, the aromatic ring of the sulfonated polysulfone and the benzene ring of the carbon nanotubes have strong attraction therebetween due to π-π interactions or van der Waals interactions. Due to the attraction, the sulfonated polysulfone is supported by the carbon nanotubes, and thus the mechanical strength of the nanocomposite is increased. In order for the nanocomposite to have greater mechanical strength, the sulfonated polysulfone may be disposed in regions where metal is not dispersed in the metal-carbon nanotubes, thereby increasing the attraction between the sulfonated polysulfone and the metal-carbon nanotubes.

In addition, in the metal-carbon nanotubes of the nanocomposite, the carbon nanotubes are impregnated with a metal that can be used as an anode. Therefore, an organic solvent such as methanol that is diffused into a cathode from an anode is oxidized, and the reduction in power generation caused by the methanol crossover can be minimized.

The term "aromatic group" used herein refers to a C6-C30 aromatic hydrocarbon such as phenylene, naphthylene, tetrahydronaphthylene, indanylene or biphenylene, or a C6-C30 aromatic hydrocarbon containing at least one hetero atom selected from the group consisting of O, N and S. The aromatic group can have a substituent such as lower alkyl, hydroxyl, a halogen atom, haloalkyl, nitro, cyano, or alkoxy.

The sulfonation degree of the nanocomposite is expressed as a percentage of the number of sulfonated polysulfone repeating units having an $SO_3M$ group based on the total sum of the number of the sulfonated polysulfone repeating units having an SO$_3$M group and the number of sulfonated polysulfone repeating units having no SO$_3$M group.

The expression "metal-carbon nanotubes are wrapped with a sulfonated polysulfone" may mean that the metal-carbon nanotubes are "dispersed" or "immersed" in the sulfonated polysulfone.

The term "metal" in the metal-carbon nanotubes refers to at least one metal atom, an alloy thereof or a mixture thereof. In addition, the metal can be a metal that can act as a catalyst for a reaction occurring in a fuel cell.

The term "carbon nanotubes are impregnated with a metal" may also mean that a metal is immersed or dispersed in the carbon nanotubes. Such carbon nanotubes are referred to as metal-carbon nanotubes in the present invention.

The sulfonated polysulfone used to prepare the nanocomposite can be a compound represented by Formula 1 below:

The sulfonation degree of the sulfonated polysulfone, which is represented by Equation 1, may be 40-80%. When the sulfonation degree of the sulfonated polysulfone is less than 40%, the ionic conductivity of the nanocomposite electrolyte membrane is reduced. When the sulfonation degree of the sulfonated polysulfone is greater than 80%, a swelling phenomenon occurs in a solvent such as water or the like, and thus the mechanical strength of the nanocomposite electrolyte membrane is reduced.

For sulfonated polysulfones other than those represented by Formula 1, the sulfonation degree may be calculated by any method known in the art.

The compound represented by Formula 1 can be a compound represented by Formula 2 below;

Formula 1

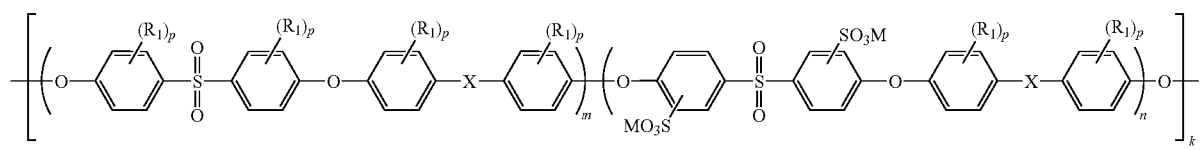

where each of the R$_1$s is independently a C1-C10 alkyl group, a C2-C10 alkenyl group, a C6-C20 aryl group or a nitro group, Formula 2

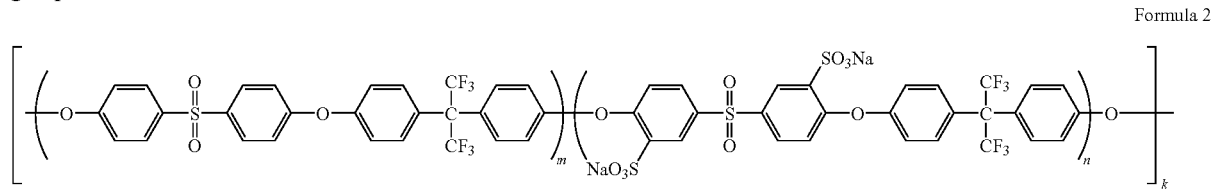

P is an integer in the range of 0-4,

X is —C(CF$_3$)$_2$—, —C(CH$_3$)$_2$— or —P(=O)Y'— (Y' is H or C$_6$H$_5$),

M is Na, K, or H, m is 0.1-10, n is 0.1-10, and k is 5-500.

In Formula 1, the ratio of m and n is the mixed ratio of a sulfonated polysulfone repeating unit having no SO$_3$M group and the sulfonated polysulfone repeating unit having a SO$_3$M group, respectively. According to the mixed ratio, the characteristics of the sulfonated polysulfone in Formula 1 such as ionic conductivity greatly differ. For excellent ionic conductivity, m may be 0.1-4 and n may be 0.1-4.

In Formula 1, when p is 0, (R$_1$)p refers to hydrogen.

The sulfonated polysulfone of Formula 1 may have a number average molecular weight of 10,000-300,000, and may have a weight average molecular weight of 20,000-500,000.

The sulfonation degree of the sulfonated polysulfone of Formula 1 can be calculated using Equation 1 below:

$$\text{Sulfonation degree of the polysulfone} = \frac{n}{m+n} \times 100(\%) \quad \text{Equation 1}$$

where m is 0.1-4, n is 0.1-4, and k is 5-500.

Nonrestrictive examples of a method of preparing the sulfonated polysulfone can include the following methods.

First, a first polymerized monomer represented by Formula 3, a second polymerized monomer represented by Formula 4, a diol compound represented by Formula 5 and an organic solvent are mixed together. Then, the resulting mixture is heated at reflux temperature while generated water is removed. After the generation of water terminates, the resultant is polymerized at a higher temperature to prepare the sulfonated polysulfone of Formula 1. The polymerization reaction is performed at a temperature in the range of 120-190° C.

Formula 3

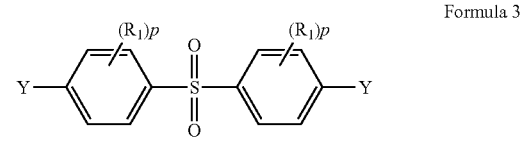

where, R$_1$ and p are defined as in Formula 1, and

Y is Cl, F, Br, or I.

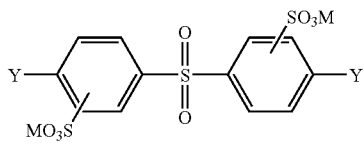

Formula 4 where M is defined as in Formula 1, and

Y is Cl, F, Br, or I.

Formula 5

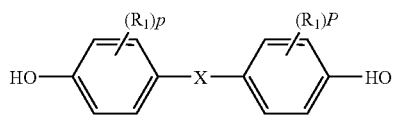

(5)

where each $R_1$ is independently selected from the group consisting of a C1-C10 alkyl group, a C2-C10 alkenyl group, a phenyl group, and a nitro group;

p is an integer from 0 to 4; and

X is —C(CF$_3$)$_2$—, —C(CH$_3$)$_2$—, or —PY'(=O)— where Y' is H or C$_6$H$_6$.

Examples of the first polymerized monomer include 4,4'-dichlorodiphenyl sulfone (DCDPS), 4,4'-difluorinediphenyl sulfone and the like and the second polymerized monomer includes sulfonated-4,4'-dichlorodiphenyl sulfone (S-DCDPS) and the like.

Examples of the diol compounds include 4,4'-(hexafluoroisopropylidene)diphenol (HFIPDP), 4,4'-sulfonyldiphenol, 4,4'-isopropylidenediphenol, 4,4'-thiodiphenol, 3,3'-(ethylenedioxy)diphenol, 4,4'-(9-fluorenylidene)diphenol, 4,4'-(1,3-adamantanediyl)diphenol, 4,4'-(9-fluorenylidene)diphenol, 4,4'-(1,3-adamantanediyl)diphenol, 4,4'-isopropylidenediphenol, 3,4'-isopropylidenediphenol, 4,4'-(9-fluorenylidene)diphenol, 4,4'-(hexafluoroisopropylidene)diphenol, 4,4'-isopropylidenediphenol, 4,4'-sulfonyl diphenol, 4,4'-thiodiphenol, bisphenol-A, 4,4'-hexafluoroisopropylidene, and the like.

In the nanocomposite, the carbon nanotubes have a very high aspect ratio, and compensate the mechanical strength of the sulfonated polysulfone. The carbon nanotubes are impregnated with a metal and thus are metal-carbon nanotubes. When the metal-carbon nanotubes contain a metal that can be used as an anode for a fuel cell, an organic fuel such as methanol that, because of its solvent properties may be diffused into a cathode from an anode is oxidized, and thus the reduction in power generation caused by methanol crossover can be minimized.

The carbon nanotubes can be commercially available carbon nanotubes. The carbon nanotubes can comprise either single-walled nanotubes (SWNTs) having a very large surface area or multi-walled nanotubes (MWNTs) having excellent crystalline properties obtained by secondary growth of the SWNTs or both SWNTs and MWNTs.

The SWNTs can be obtained by forming a first metal catalyst layer and then growing the first metal catalyst layer. Alternatively, a commercially available product can be used as the SWNTs.

A metal catalyst used for secondary growth of the MWNTs can be at least one selected from the group consisting of a transition metal such as Ni, Fe, Co or the like and alloys thereof. The metal catalyst can be in a transition metal state or in an ionic state.

The carbon nanotubes may have an average diameter of 2-200 nm. As a more specific, non-limiting example, the carbon nanotubes may have an average diameter of 5-150 nm. The carbon nanotubes may have a length of 0.01-100 μm. As a more specific, non-limiting example, the carbon nanotubes may have a length of 0.1-20 μm, but the diameter and length thereof are not limited thereto.

The metal of the metal-carbon nanotubes can be any metal that can act as a catalyst for a reaction occurring in a fuel cell. As non-limiting examples, the metal may be at least one selected from the group consisting of Pt, Pd, Ru, Rh, Ir, Au and alloys thereof, and as a more non-limiting example, the metal may be a PtRu alloy in order to minimize methanol crossover.

In a nanocomposite according to an embodiment of the present invention, the amount of the metal-carbon nanotubes may be 0.01-20 parts by weight based on 100 parts by weight of the nanocomposite. When the amount of the metal-carbon nanotubes is less than 0.01 parts by weight, excellent mechanical strength of the nanocomposite cannot be obtained. When the amount of the metal-carbon nanotubes is greater than 20 parts by weight, the ionic conductivity of the nanocomposite is reduced.

The amount of the metal contained in the metal-carbon nanotubes may be 0.01-40 parts by weight based on 100 parts by weight of the metal-carbon nanotubes. When the amount of the metal of the metal-carbon nanotubes is less than 0.01 parts by weight, the effect of suppressing methanol crossover is small. When the amount of the metal of the metal-carbon nanotubes is greater than 40 parts by weight, there is not an additional gain in the suppression of the methanol crossover and the manufacturing cost of the metal-carbon nanotubes in increased.

In a nanocomposite according to an embodiment of the present invention, sulfonated metal-carbon nanotubes that further contain a —SO$_3$H group in addition to a metal can be used in order to improve the ionic conductivity of an electrolyte membrane. The amount of the —SO$_3$H group may be 0.1-70 parts by weight based on 100 parts by weight of the sulfonated metal-carbon nanotubes.

A method of preparing metal-carbon nanotubes used in the nanocomposite according to aspects of the present invention will now be described.

First, a metal precursor is mixed with an organic solvent such as acetone to prepare a precursor mixture. Carbon nanotubes are added to a container such as a zipper bag, and then the precursor mixture is added to the container to impregnate the carbon nanotubes with the precursor mixture. The carbon nanotubes impregnated with the precursor mixture are dried while the container is left open. The dried carbon nanotube is placed in a melting pot and additionally dried at 50-80° C. in an oven overnight. The melting pot is placed in a furnace and slowly heated at 200-300° C. under a hydrogen atmosphere. The sample is maintained for several hours under the same conditions, that is, at 200-300° C. under a hydrogen atmosphere to reduce the metal precursor. If needed, hydrogen is substituted with nitrogen, and then the resultant is heat-treated at 300-400° C. for 1-5 hours more to prepare metal-carbon nanotubes.

The metal precursor can be prepared using various well-known methods, and thus the method of preparing the metal precursor is not described in detail in the present application.

In addition, the metal-carbon nanotubes can be prepared to further comprise an —$SO_3H$ group using a sulfonation process, which is described as follows.

First, sulfate is dissolved in a solvent to prepare a mixed solution. The solvent can be a mixed solvent comprising acetone and pure water. The amount of the solvent may be 50-500 parts by weight based on 100 parts by weight of carbon nanotubes.

The metal-carbon nanotubes as described above are put in a container such as a zipper bag or the like and then the mixed solution is added to the container and mixed with the metal-carbon nanotubes. While the container is left open, the mixture is dried in a hood and further dried at 50-70° C. in an oven overnight. The dried resultant is placed in a furnace and then heated to a temperature of 200-400° C. for 2 hours or more under an air atmosphere to obtain desired metal-carbon nanotubes containing an —$SO_3H$ group.

Alternatively, sulfonated metal-carbon nanotubes can be prepared by first sulfonating carbon nanotubes with an —$SO_3H$ group, and then impregnating a metal into the sulfonated carbon nanotubes.

Figure 1B:
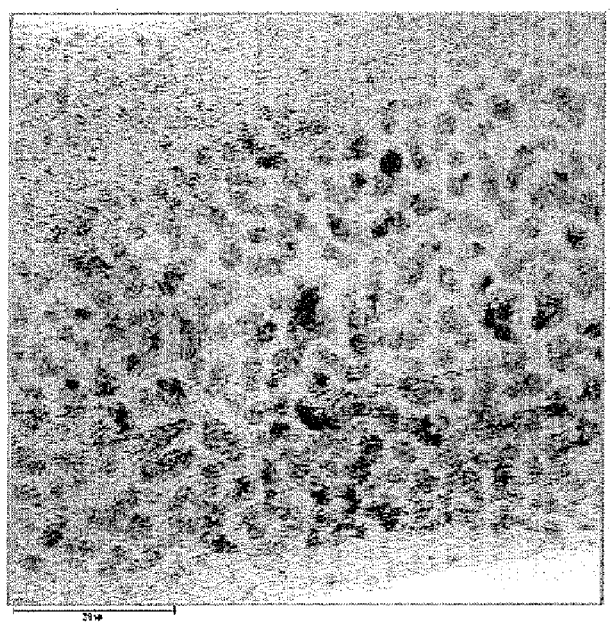

FIG. 1A is a TEM microscopic image of a PtRu-carbon nanotube comprising a PtRu alloy, which is used to prepare a nanocomposite according to an embodiment of the present invention. The size of the graduation illustrated in FIG. 1A is 50 nm. FIG. 1B is an enlarged TEM microscopic image of a region encircled in a white circle in FIG. 1A. The size of a graduation represented in FIG. 1B is 20 nm. The black regions in FIG. 1B represent the uniform dispersion of PtRu in the carbon nanotube.

Figure 2:
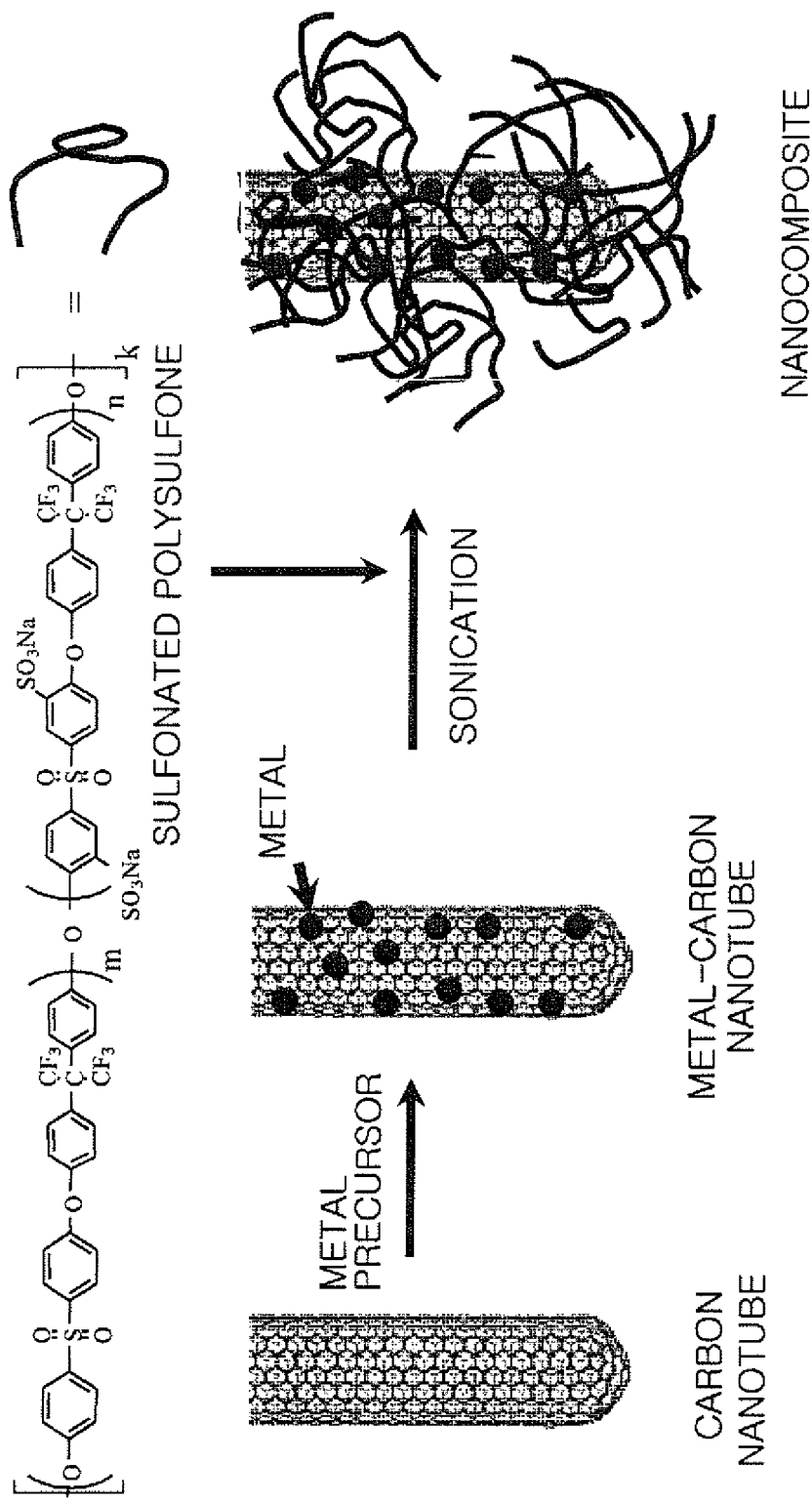
FIG. 2 is a diagram illustrating a method of preparing a nanocomposite according to an embodiment of the present invention.

A method of preparing a nanocomposite according to aspects of the present invention will now be described with reference to FIG. 2.

First, the sulfonated polysulfone prepared using the process described above is dissolved in an organic solvent such as N,N-dimethylacetamide (DMAc) to prepare a mixed solution. However, the present invention is not limited thereto, and the organic solvent can be N,N'-dimethylsulfoxide (DMSO), N-methyl-2-pyrrolidone (NMP), dimethylformamide (DMF) or the like. The amount of the organic solvent may be 100-2,000 parts by weight based on 100 parts by weight of the sulfonated polysulfone.

The metal-carbon nanotubes prepared as described above are added to the mixed solution and the resultant mixture is treated with ultrasonic waves. The resultant mixture is stirred at room temperature for 12-36 hours to prepare a dispersion solution comprising a nanocomposite according to aspects of the present invention. The prepared dispersion solution itself can be used as a composition used to form an electrolyte membrane for preparing an electrolyte membrane of a fuel cell.

A method of preparing a nanocomposite electrolyte membrane according to aspects of the present invention will now be described.

The composition used to form an electrolyte membrane, which is prepared using the process described above, is cast or coated onto a support, and the resultant is dried to form an electrolyte membrane comprising the nanocomposite. The organic solvent used in the composition used to form the electrolyte membrane can be used further for this process.

After the electrolyte membrane is prepared using the process described above, the electrolyte membrane can be acid-treated. The electrolyte membrane is immersed into an aqueous sulfuric acid solution and then heat-treated at its boiling point. The electrolyte membrane is then washed with deionized water and allowed to sit at room temperature for 24 hours. Subsequently, the resultant is again washed with deionized water. The concentration of the aqueous sulfuric acid solution may be 0.1-3 M As a specific, non-limiting example, the concentration of the aqueous sulfuric acid solution may be about 0.5-2 M.

Hereinafter, examples of preparing a fuel cell using a nanocomposite electrolyte membrane according to an embodiment of the present invention will be described in detail.

A nanocomposite electrolyte membrane according to an embodiment of the present invention can be applied to any kind of fuel cell which employs an electrolyte membrane containing a polymer electrolyte, such as, for example, a polymer electrolyte membrane fuel cell (PEMFC) using hydrogen as fuel. In particular, the nanocomposite electrolyte membrane according to an embodiment of the present invention is especially useful in direct methanol fuel cells (DMFCs) using a mixed vapor of methanol and water or an aqueous methanol solution as a fuel.

A fuel cell according to aspects of the present invention includes a cathode, where oxygen is reduced, an anode, where fuel is oxidized, and an electrolyte membrane disposed between the cathode and the anode, and a nanocomposite electrolyte membrane described above as the electrolyte membrane.

The cathode includes a catalyst layer for facilitating oxygen reduction. The catalyst layer included in the anode may contain catalyst particles and a polymer with cation exchange groups. For example, the catalyst layer of the cathode may include a carbon supported platinum (Pt/C) catalyst.

The anode includes a catalyst layer for facilitating the oxidation of fuel, such as hydrogen, natural gas, methanol, ethanol, etc. The catalyst layer included in the anode may contain catalyst particles and a polymer with cation exchange groups. The catalyst layer of the cathode may include a Pt/C catalyst, a carbon-supported platinum-ruthenium (Pt—Ru/C) catalyst, etc., but the present invention is not limited thereto. The Pt—Ru/C catalyst is especially useful in fuel cells in which organic fuels other than hydrogen are directly supplied to the anode.

Each catalyst for the cathode and the anode contains catalytic metal particles and a catalyst support. Suitable catalyst supports include a conductive solid powder, such as carbon powder, with micropores for incorporating catalytic metal particles therein. Examples of carbon powder include carbon black, Ketzen black, acetylene black, activated carbon powder, carbon nano-fibers, and mixtures thereof. The above-described examples of polymers having cation exchange groups can be used for the catalyst layers of the cathode and anode.

The catalyst layers of the cathode and anode directly contact the nanocomposite electrolyte membrane.

Each of the cathode and the anode may further include a gas diffusion layer in addition to the catalyst layer. The gas diffusion layer contains porous materials that are electrically conductive and acts as a current collector and as an entry/exit path of reactants and reaction products. Examples of materials for the gas diffusion layer include, but are not limited to, carbon paper, including waterproofed carbon paper and waterproof carbon paper with a waterproof carbon black layer. Waterproof carbon paper for the gas diffusion layer contains a hydrophobic polymer, such as polytetrafluoroethylene (PTFE), which is sintered. The use of waterproof materials for the gas diffusion layer enables both polar liquid and gaseous reactants to pass through the gas diffusion layer. In waterproof carbon paper with a waterproof carbon black layer, the waterproof carbon black layer contains carbon black and a hydrophobic polymer, such as PTFE, as a binder. This waterproof carbon black layer is attached to a surface of a waterproof carbon paper as described above. The hydrophobic polymer of the waterproof carbon black layer is sintered.

Fuels that can be supplied to the anode of the fuel cell according to aspects of the present invention include hydrogen, natural gas, methanol, ethanol, etc.

In the fuel cell prepared as described above according to aspects of the present invention, a sulfonated polysulfone having a high sulfonation degree is stably supported by metal-carbon nanotubes, and thus the mechanical strength and ionic conductivity of the fuel cell are excellent. In addition, an electrolyte membrane contained in the fuel cell comprises a metal dispersed therein that can be used as a metal catalyst of an anode, and thus methanol crossover can be minimized.

Aspects of the present invention will now be described in greater detail with reference to the following examples. The following examples are for illustrative purposes only and are not intended to limit the scope of the invention.

Synthesis Example 1

Preparation of Sulfonated Polysulfone 0.09792 moles of sulfated-4,4'dichlorodiphenyl sulfone (S-DCDPS), 0.10608 moles of 4,4'dichlorodiphenyl sulfone (DCDPS), 0.204 moles of 4,4'-(hexafluoroisopropylidene) diphenol (HFIPDP), and 0.204 moles of potassium carbonate were added to a mixed solution of 120 ml of N-methyl-2-pyrrolidone (NMP) and 100 ml of toluene. The mixture was refluxed at 160° C. for 12 hours, and generated water was removed using a Dean-Stark apparatus. When the water was fully removed, the toluene was removed through a valve. Then the temperature of the reacted mixture was raised to 180° C. over 2 hours and a polymerization reaction was performed for 4 hours.

As the polymerization progressed, the viscosity of the solution was raised. After completion of the polymerization, the polymerized solution was cooled down to room temperature and then poured into triple distilled water (1000 ml) to obtain a precipitate. The resultant precipitate was washed 3 times and dried to obtain a sulfonated polysulfone having a sulfonation degree of 48%.

Synthesis Example 2

Preparation of Sulfonated Polysulfone 0.105 moles of S-DCDPS, 0.95 moles of DCDPS, 0.204 moles of HFIPDP, and 0.2448 moles of potassium carbonate were added to a mixed solution of 120 ml of NMP and 100 ml of toluene. The mixture was refluxed at 160° C. for 12 hours, and generated water was removed using a Dean-Stark apparatus. When the water was fully removed, the toluene was removed through a valve. Then the temperature of the reacted mixture was raised to 180° C. over 2 hours and a polymerization reaction was performed for 4 hours.

As the polymerization progressed, the viscosity of the solution increased. After completion of the polymerization, the polymerized solution was cooled down to room temperature and then poured into triple distilled water (1000 ml) to obtain a precipitate. The resultant precipitate was washed 3 times and dried to obtain a sulfonated polysulfone having a sulfonation degree of 52%.

Synthesis Example 3

Preparation of PtRu-Carbon Nanotube 0.0915 g of $H_2PtCl_6$, which is a Pt precursor, and 0.0475 g of $RuCl_3$, which is an Ru precursor were completely dissolved in 1.5 ml of acetone to prepare a precursor mixed solution. 0.5 g of carbon nanotubes were put into a zipper bag, the precursor mixed solution was added to the zipper bag, and then the carbon nanotubes and the precursor mixed solution were completely mixed. While the zipper bag was left open, the resultant mixture was dried in a hood for 4 hours. The resultant sample was then placed in a melting pot and dried at 60° C. in an oven overnight.

The dried sample was placed in a furnace, heated at a rate of 0.6° C./minute to a temperature of 250° C. under a hydrogen atmosphere, and then maintained at the same temperature for 2 hours more to be reduced. In the furnace, hydrogen was substituted with nitrogen, and then the resultant was heated at a rate of 5° C./minute to a temperature of 350° C. and maintained at the same temperature for 3 hours more. The temperature of the furnace was then cooled to room temperature. As a result, PtRu-carbon nanotubes were obtained.

Meanwhile, the obtained PtRu-carbon nanotubes were analyzed using an inductively coupled plasma (ICP) analysis. As a result, the amount of Pt and Ru was found to be 3.05% and 6.16%, respectively, based on 100 parts by weight of the PtRu-carbon nanotubes.

Example 1

Preparation of Nanocomposite and Nanocomposite Electrolyte Membrane

The sulfonated polysulfone prepared in Synthesis Example 1 was dissolved in DMAc, and the PtRu-carbon nanotubes prepared in Synthesis Example 3 were added to the mixture tin the amount of 1 weight % based on the total weight of the mixture. The resultant mixture was treated with ultrasonic waves at room temperature for 40-60 minutes, and then stirred at room temperature for 12 hours to obtain a composition comprising the nanocomposite in a dispersion solution state, which is used to form an electrolyte membrane.

The dispersion solution was cast on glass, and then the resultant was heated at 60° C. to obtain an electrolyte membrane. The obtained electrolyte membrane was heated in a 0.5 M aqueous sulfuric acid solution for 2 hours or more, and washed with pure water three times or more over a period of 48 hours. Then, mechanical properties of the electrolyte membrane were measured according to Evaluation Examples 1 through 3 below.

Example 2

Preparation of Nanocomposite and Nanocomposite Electrolyte Membrane

A nanocomposite and a nanocomposite electrolyte membrane were prepared in the same manner as in Example 1, except that the sulfonated polysulfone prepared in Synthesis Example 2 was used instead of the sulfonated polysulfone prepared in Synthesis Example 1.

The obtained electrolyte membrane was heated in a 0.5 M aqueous sulfuric acid solution for 2 hours or more, and washed with pure water three times or more over a period of 48 hours. Then, mechanical properties of the electrolyte membrane were measured according to Evaluation Examples 1 through 3 below.

Figure 3:
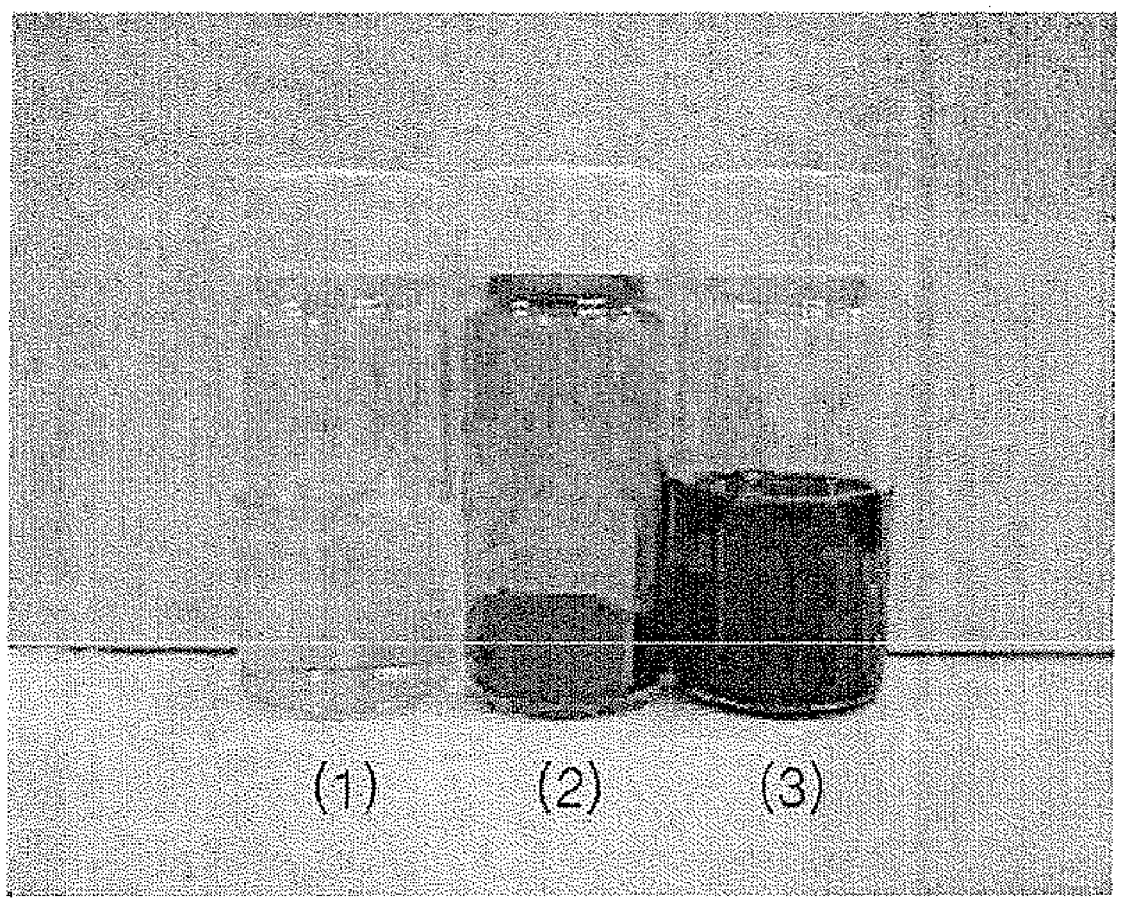
FIG. 3 is a photographic image showing the dispersion state of a nanocomposite prepared in Example 2.

FIG. 3 is a photographic image showing the dispersion state of the nanocomposite prepared in Example 2. Referring to FIG. 3, the sample designated as Sample (1) is a sample in which the sulfonated polysulfone prepared in Synthesis Example 2 is dissolved, the sample designated as Sample (2) is a sample containing PtRu-carbon nanotubes prepared in Synthesis Example 3, and the sample designated as Sample (3) is a composition used to form an electrolyte membrane comprising a nanocomposite prepared in Example 2. In Sample (3), phase separation in which metal-carbon nanotubes were precipitated at the bottom of the container was not observed. Without being bound to any particular theory, it can be theorized that strong attraction between metal-carbon nanotubes and the sulfonated polysulfone is due to $\pi$-$\pi$ interactions or van der Waals interactions of aromatic rings of the carbon nanotubes and the sulfonated polysulfone, and thus the metal-carbon nanotubes exist in a dispersed state.

Comparative Example 1

Preparation of Electrolyte Membrane

The sulfonated polysulfone prepared in Synthesis Example 1 was dissolved in DMAc, and then cast on glass without further adding PtRu-carbon nanotubes. The resultant was heated at 60° C. to obtain an electrolyte membrane.

The obtained electrolyte membrane was heated in 0.5 M of an aqueous sulfuric acid solution for 2 hours or more, and washed with pure water three times or more over a period of 48 hours. Then, mechanical properties of the electrolyte membrane were measured according to Evaluation Examples 1 through 3 below.

Comparative Example 2

Preparation of Electrolyte Membrane

The sulfonated polysulfone prepared in Synthesis Example 2 was dissolved in DMAc, and then cast on glass without further adding PtRu-carbon nanotubes. The resultant was heated at 60° C. to obtain an electrolyte membrane.

The obtained electrolyte membrane was heated in 0.5 M of an aqueous sulfuric acid solution for 2 hours or more, and washed with pure water three times or more over a period of 48 hours. Then, mechanical properties of the electrolyte membrane were measured. The results are shown in Table 1.

Evaluation Example 1

Tensile Strength

The electrolyte membranes prepared in Examples 1 and 2, and Comparative Examples 1 and 2 were cut into sections having a width of 5 mm, respectively, to prepare specimens, and the mechanical strength of the electrolyte membranes were measured using an Instron universal test machine (UTM). Here, the interval between grips was 10 mm, and a 100 N load cell was attached on a lower portion of an Instron UTM.

Figure 4:
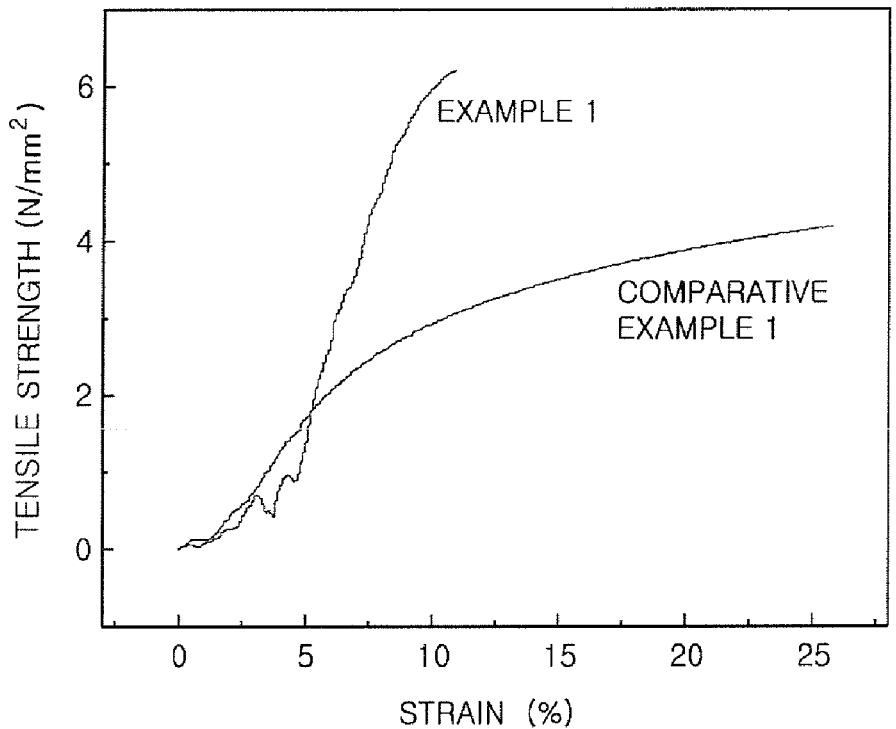
FIG. 4 is a graph showing the tensile strength of electrolytes prepared in Example 1 and Comparative Example 1.
Figure 5:
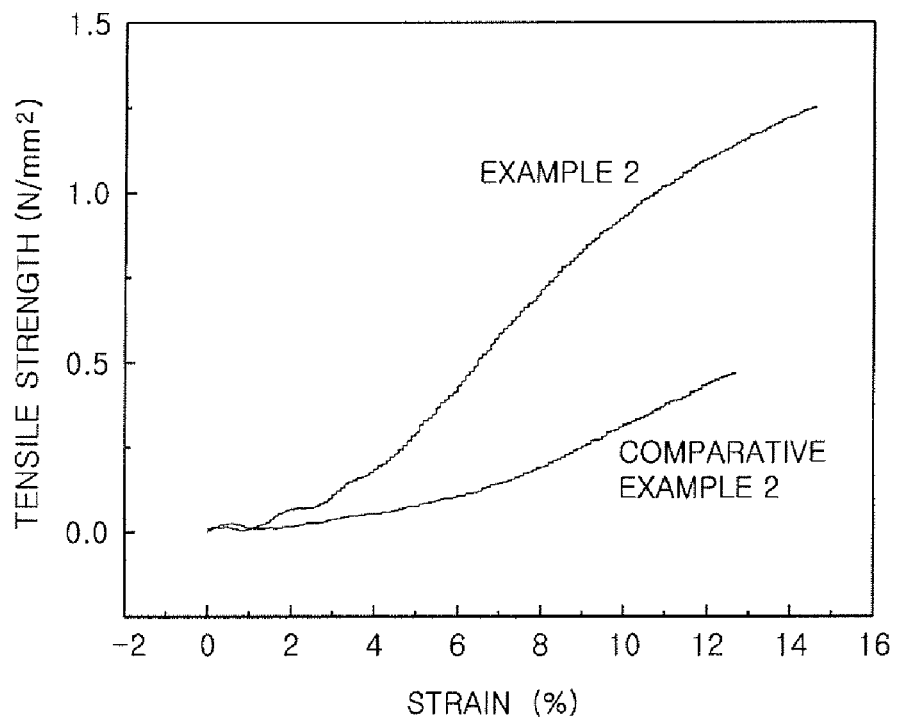
FIG. 5 is a graph showing the tensile strength of electrolytes prepared in Example 2 and Comparative Example 2.

The tensile strength with respect to strain of each of the electrolyte membranes prepared in Examples 1 and 2, and Comparative Examples 1 and 2 is shown in FIGS. 4 and 5.

Evaluation Example 2

Ionic Conductivity

The ionic conductivity and methanol permeability of the electrolyte membranes prepared in Examples 1 and 2, and Comparative Examples 1 and 2 were measured. The evaluation results are shown in Table 1 below. The ionic conductivity was measured using a 4-point probe method. The electrolyte membranes immobilized on a 4-probe cell were placed into deionized water, and an alternating current in a frequency range of 20 Mv, 500000 Hz-0.1 Hz was applied thereto at temperatures of room temperature (25° C.), 40° C., 50° C. and 60° C. to obtain a Nyquist plot. The obtained ionic conductivity results are shown in Table 1.

Evaluation Example 3

Methanol Permeability

The methanol permeability of the electrolyte membranes prepared in Examples 1 and 2, and Comparative Examples 1 and 2 was measured by immersing each of the electrolyte membranes in pure water for one day or more and then immobilizing the electrolyte membranes onto a methanol permeability cell. The results are shown in Table 1.

Evaluation Example 4

Durability Evaluation

Figure 6:
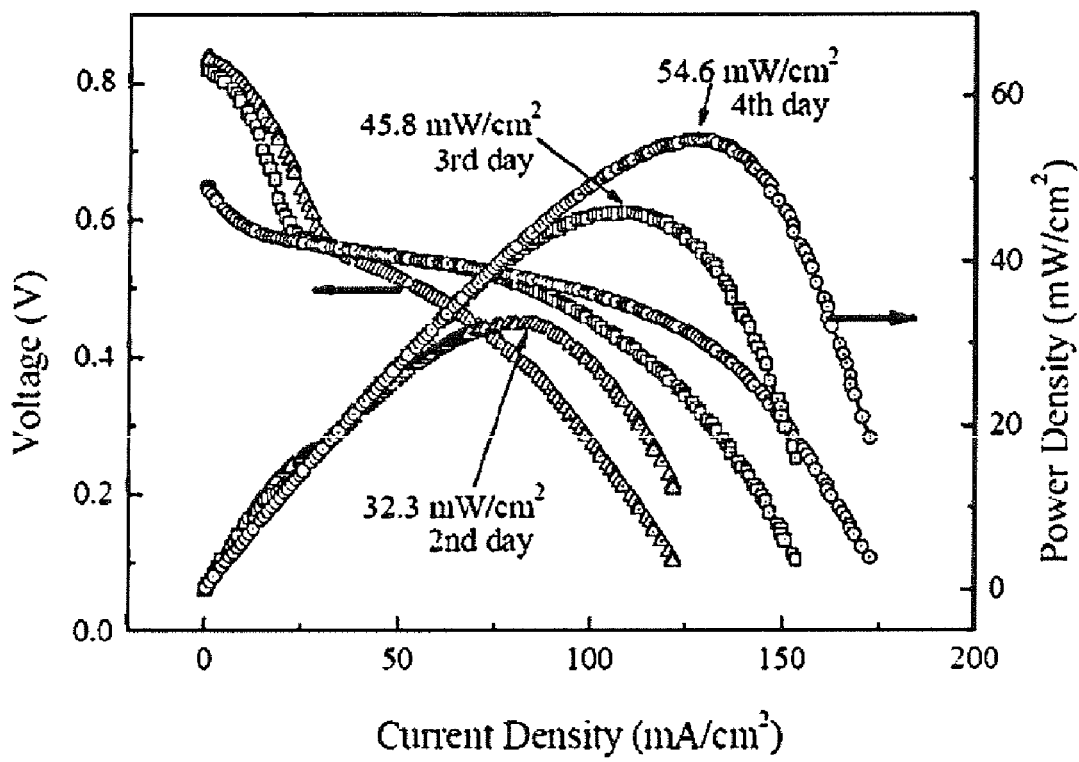
FIG. 6 is a graph showing the performance behavior with respect to time of a fuel cell manufactured using an electrolyte prepared in Example 2.
Figure 7:
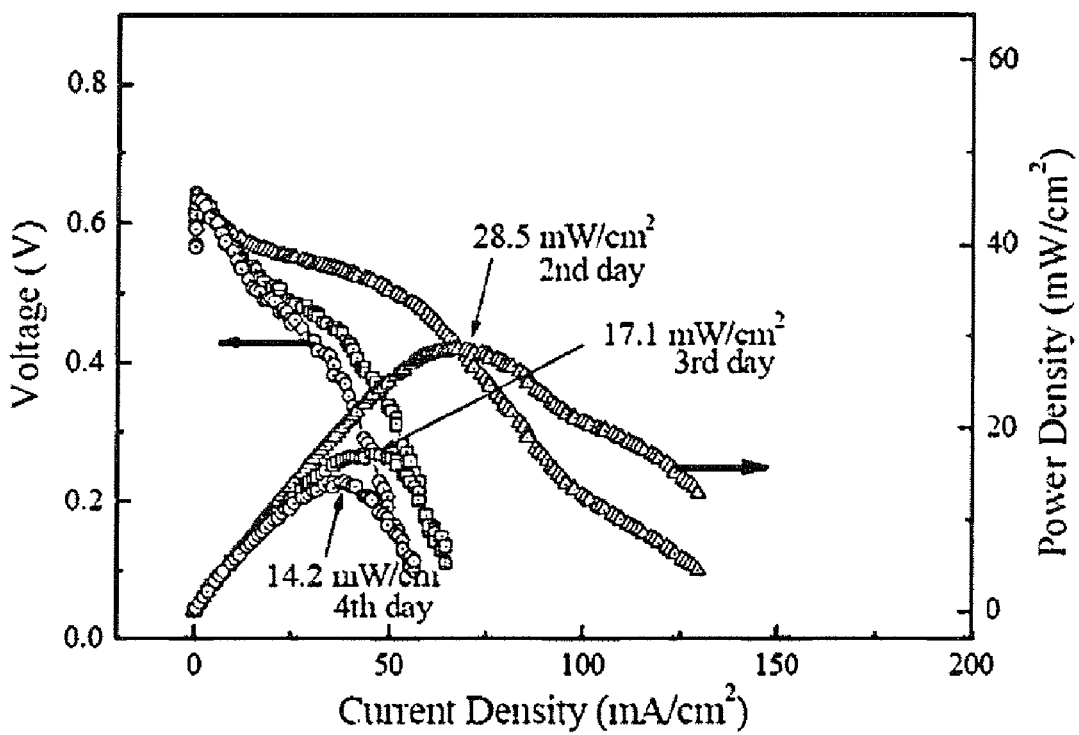
FIG. 7 is a graph showing the performance behavior with respect to time of a fuel cell manufactured using an electrolyte prepared in Comparative Example 2.

A single cell was prepared using the electrolyte membranes prepared in Example 2 and Comparative Example 2. The durability of the electrolyte membranes was determined by measuring voltage and power density versus current density by day. The results are shown in FIGS. 6 and 7.

TABLE 1

| | Sulfonation degree (%) | Carbon nanotube amount (wt %) | Ionic conductivity (S/cm) | Methanol permeability (cm$^2$/second) |
|---|---|---|---|---|
| Example 1 | 48 | 1 | 0.098 | $2.57 \times 10^{-6}$ |
| Example 2 | 52 | 1 | 0.100 | $2.16 \times 10^{-6}$ |
| Comparative Example 1 | 48 | 0 | 0.081 | $2.55 \times 10^{-6}$ |
| Comparative Example 2 | 52 | 0 | 0.088 | $2.85 \times 10^{-6}$ |

Referring to Table 1, it can be seen that the nanocomposite electrolyte membranes of Examples 1 and 2 exhibit higher ionic conductivity and lower methanol permeability compared with the nanocomposite electrolyte membranes of Comparative Examples 1 and 2.

Referring to FIG. 4, it can be confirmed that the electrolyte membrane of Example 1 in which sulfonated polysulfone is supported by carbon nanotubes has excellent tensile strength compared with the electrolyte membrane of Comparative Example 1. FIG. 5 also shows the same result with respect to the electrolyte membranes of Example 2 and Comparative Example 2.

Referring to FIGS. 6 and 7, a fuel cell manufactured using the electrolyte membrane of Comparative Example 2 has reduced maximum performance over time (FIG. 7), while a fuel cell manufactured using the electrolyte membrane of Example 2 has improved durability (FIG. 6). Since the nanocomposite in the electrolyte membrane of Example 2 comprises metal-carbon nanotubes, the electrolyte membrane of Example 2 also has improved mechanical strength and ionic conductivity (see Table 1).

An electrolyte membrane comprising the nanocomposite according to aspects of the present invention has excellent mechanical strength and ionic conductivity although it includes a sulfonated polysulfone having a high degree of sulfonation. In addition, the electrolyte membrane comprises a metal dispersed therein that can function as a catalyst for the anode, and thus the reduction in power generation caused by methanol crossover can be minimized.

In a fuel cell employing the electrolyte membrane as described above, when an aqueous methanol solution is used as a fuel, methanol crossover is more suppressed, and accordingly, the fuel cell has an improved operating efficiency and a longer lifetime.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nanocomposite comprising:
   metal-carbon nanotubes; and
   a sulfonated polysulfone, wherein the sulfonated polysulfone is represented by Formula 1 below:

Formula 1

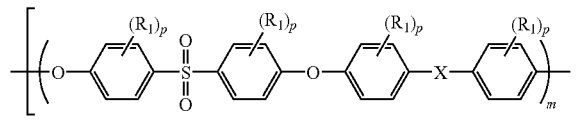

where each of the $R_1$ s is independently a C1-C10 alkyl group, a C2-C10 alkenyl group, a C6-C20 aryl group or a nitro group, P is an integer in the range of 0-4,
X is —C(CF$_3$)$_2$—, —C(CH$_3$)$_2$— or —P(=O)Y'— (Y' is H or C$_6$H$_5$),
M is Na, K, or H,
m is 0.1-10, n is 0.1-10, and k is 5-500.

2. The nanocomposite of claim 1, wherein the sulfonated polysulfone is a polymer compound represented by Formula 2 below:

where m is 0.1-4, n is 0.1-4,
and k is 5-500.

3. The nanocomposite of claim 1, wherein the sulfonated polysulfone has a number average molecular weight of 10,000 to 300,000, and a weight average molecular weight of 20,000 to 500,000.

4. The nanocomposite of claim 1, wherein the sulfonated polysulfone has a sulfonation degree of 40-80%.

5. The nanocomposite of claim 1, wherein the metal-carbon nanotubes comprise single-walled nanotubes, multi-walled nanotubes or a combination of single-walled and multi-walled nanotubes.

6. The nanocomposite of claim 1, wherein the metal-carbon nanotubes comprise at least one metal selected from the group consisting of Pt, Pd, Ru, Rh, Ir, Au and alloys thereof.

7. The nanocomposite of claim 1, wherein the metal-carbon nanotubes comprise a PtRu alloy.

8. The nanocomposite of claim 1, wherein the metal-carbon nanotubes are formed by impregnating carbon nanotubes with a metal precursor and heat treating the metal precursor impregnated carbon nanotubes.

9. The nanocomposite of claim 1, wherein the metal-carbon nanotubes are sulfonated.

10. The nanocomposite of claim 9, wherein the sulfonated metal-carbon nanotubes contain —SO$_3$H groups in the amount of 0.1-70 parts by weight based on 100 parts by weight of the sulfonated metal-carbon nanotubes.

11. The nanocomposite of claim 1, wherein the amount of the metal-carbon nanotubes is 0.01-20 parts by weight based on 100 parts by weight of the nanocomposite.

12. The nanocomposite of claim 1, wherein the amount of metal of the metal-carbon nanotubes is 0.01-40 parts by weight based on 100 parts by weight of the metal-carbon nanotubes.

13. An electrolyte membrane comprising the nanocomposite according to claim 1.

14. The electrolyte membrane according to claim 13, wherein the sulfonated polysulfone is a polymer compound represented by Formula 2 below:

Formula 2

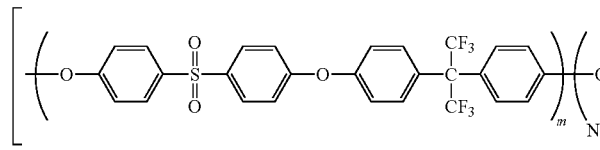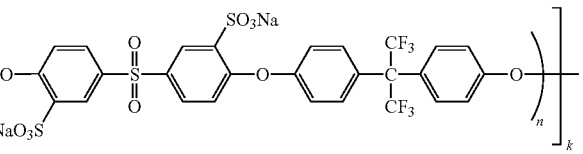

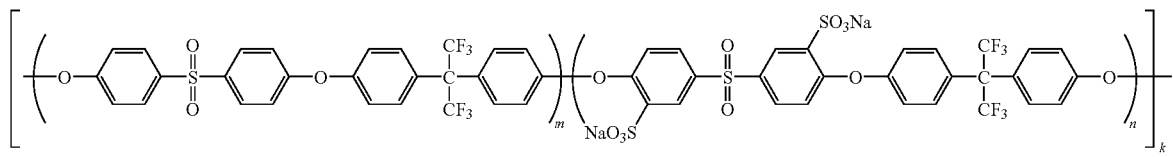

Formula 2 where m is 0.1-4, n is 0.1-4, and k is 5-500.

15. The electrolyte membrane according to claim 13, wherein the metal-carbon nanotubes comprise at least one metal selected from the group consisting of Pt, Pd, Ru, Rh, Ir, Au and alloys thereof.

16. The electrolyte membrane according to claim 13, wherein the metal-carbon nanotubes comprise a PtRu alloy.

17. A fuel cell comprising a cathode, an anode, and an electrolyte membrane comprising the nanocomposite according to claim 1, wherein the electrolyte membrane is disposed between the cathode and the anode.

* * * * *